(12) United States Patent
Zhang et al.

(10) Patent No.: US 7,726,616 B2
(45) Date of Patent: Jun. 1, 2010

(54) SUPPORT STAND FOR FLAT-PANEL DISPLAY MONITOR

(75) Inventors: Han-Zheng Zhang, Shenzhen (CN); Jin-Xin Wang, Shenzhen (CN); Xiao-Bo Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/396,555

(22) Filed: Mar. 3, 2009

(65) Prior Publication Data

US 2010/0072329 A1 Mar. 25, 2010

(30) Foreign Application Priority Data

Sep. 25, 2008 (CN) .................... 2008 1 0304675

(51) Int. Cl.
*E04G 3/00* (2006.01)
(52) U.S. Cl. .................... 248/284.1; 248/917; 248/920; 361/679.06
(58) Field of Classification Search ............. 248/274.1, 248/284.1, 372.1, 917, 919, 920, 921, 922, 248/923; 361/679.02, 679.06, 679.07
See application file for complete search history.

(56) References Cited

U.S. PATENT DOCUMENTS

| | | | | |
|---|---|---|---|---|
| 6,478,275 | B1 * | 11/2002 | Huang | 248/284.1 |
| 6,554,238 | B1 * | 4/2003 | Hibberd | 248/278.1 |
| 6,769,657 | B1 * | 8/2004 | Huang | 248/278.1 |
| 7,494,104 | B2 * | 2/2009 | Baek | 248/372.1 |
| 2006/0032998 | A1 * | 2/2006 | Depay | 248/291.1 |
| 2007/0047186 | A1 * | 3/2007 | Jang | 361/681 |
| 2007/0152125 | A1 * | 7/2007 | Lee | 248/398 |
| 2007/0194183 | A1 * | 8/2007 | Kim | 248/125.9 |
| 2008/0029661 | A1 * | 2/2008 | Chen | 248/176.1 |
| 2008/0192417 | A1 * | 8/2008 | Hwang et al. | 361/681 |
| 2008/0258029 | A1 * | 10/2008 | Zhang | 248/284.1 |

* cited by examiner

*Primary Examiner*—Ramon O Ramirez
(74) *Attorney, Agent, or Firm*—Clifford O. Chi

(57) ABSTRACT

A support stand for a flat-panel display monitor includes a mounting base, a connecting base, and two link shafts. Each link shaft has a first end rotatably connected to the mounting base and a second end rotatably connected to the connecting base. The support stand further includes a restricting pole fixed to the mounting base and positioned between the two link shafts, the restricting pole abuts against the two link shafts, thus restricting a rotary range of the two link shafts.

17 Claims, 5 Drawing Sheets

SUPPORT STAND FOR FLAT-PANEL DISPLAY MONITOR

BACKGROUND

1. Technical Field

The present disclosure generally relates to support stands, particularly, to a support stand for a flat-panel display monitor.

2. Description of Related Art

Flat-panel display monitors, such as liquid crystal display monitors, offer advantages over cathode ray tubes such as reduced size, smaller weight, and better image quality. A viewing angle and a height of the flat-panel display monitor can be adjusted without moving a support stand because of its small weight.

A typical support stand generally includes a bracket to attach to the flat-panel display monitor, a rotatable bracket fixed to the bracket, an elevating mechanism, a support member, and a base member to mount the support member. A first end of the elevating mechanism is rotatably connected to the rotatable bracket and a second end of the elevating mechanism is supported by the support member.

The elevating mechanism includes a link bracket defining a curved retaining groove. The support member includes an inner side portion and a retaining piece formed at the inner side portion corresponding to the curved retaining groove. The retaining piece of the support member engages in the curved retaining groove of the link bracket to restrict an adjusting range of the height of the flat-panel display monitor. However, the retaining piece may be easily abraded and damaged by an exterior force. As a result, the support member may have a low impact resistance and an unsatisfactory limiting effect. In addition, it is inconvenient to machine the curved retaining groove in the link bracket, thus making the production of the typical support stand complicated.

What is needed, therefore, is a new support stand for a flat-panel display monitor that overcomes the above mentioned disadvantages.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

Figure 1:
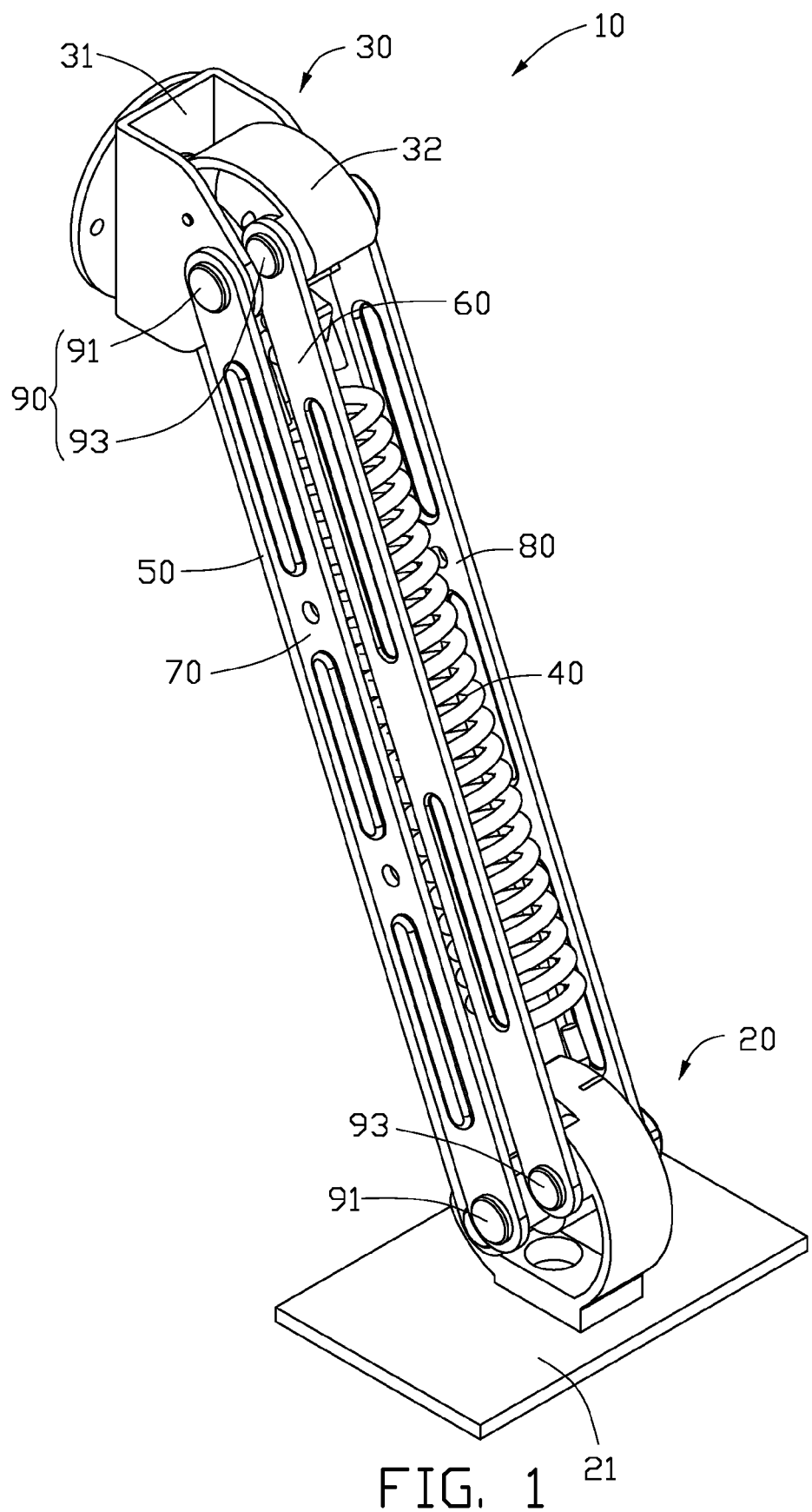
FIG. 1 is an assembled, isometric view of an embodiment of a support stand for a flat-panel display monitor, the support stand including a connecting base and a rotatable assembly.

Referring to FIG. 1, a support stand 10 for a flat-panel display monitor includes a first connecting module 20, a second connecting module 30, a resilient member 40 positioned between the first and second connecting modules 20, 30, a first link shaft 50, a second link shaft 60, a first support bracket 70, a second support bracket 80, and a pivot module 90.

Figure 2:
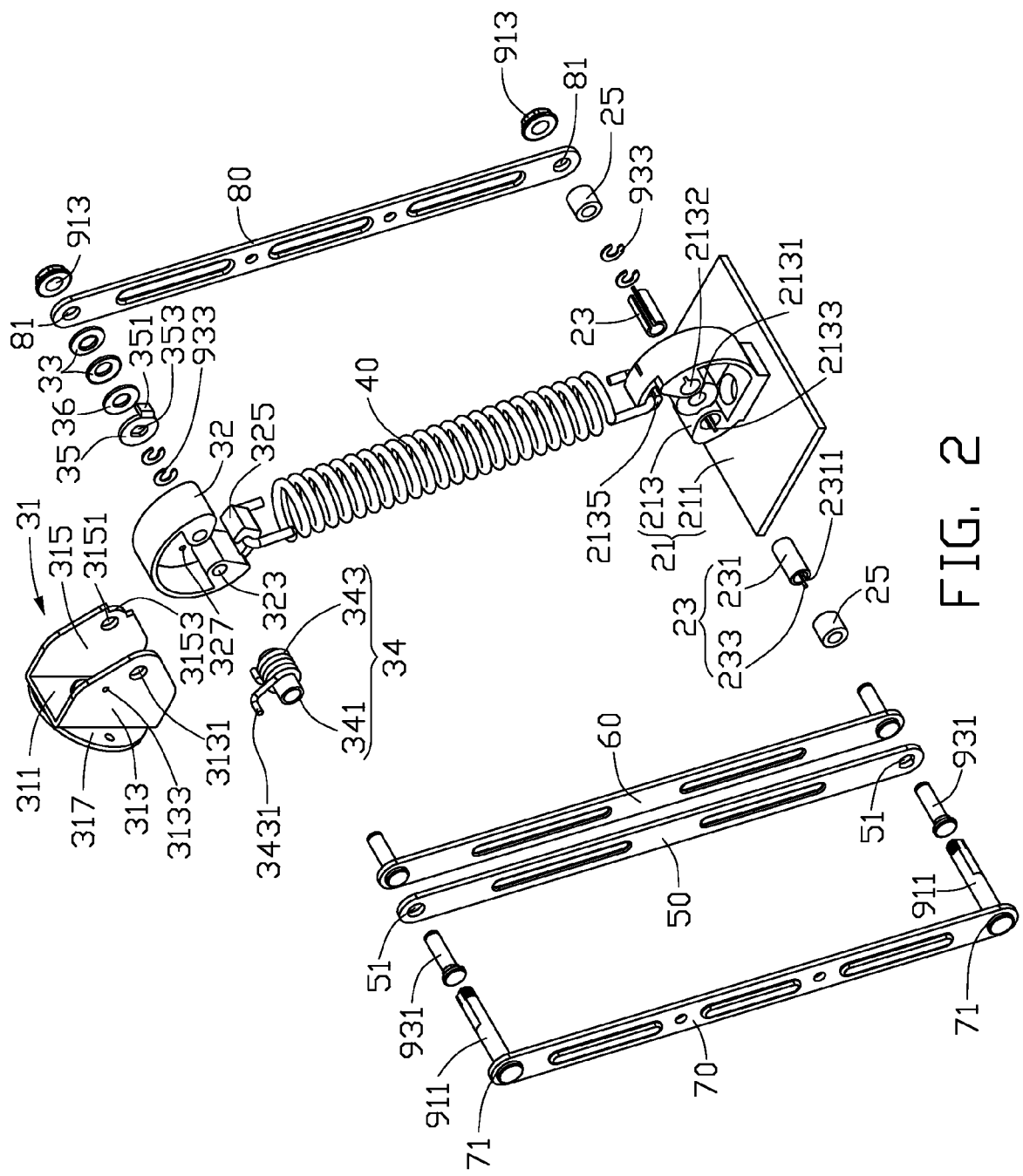
FIG. 2 is an exploded, isometric view of the support stand in FIG. 1.
Figure 3:
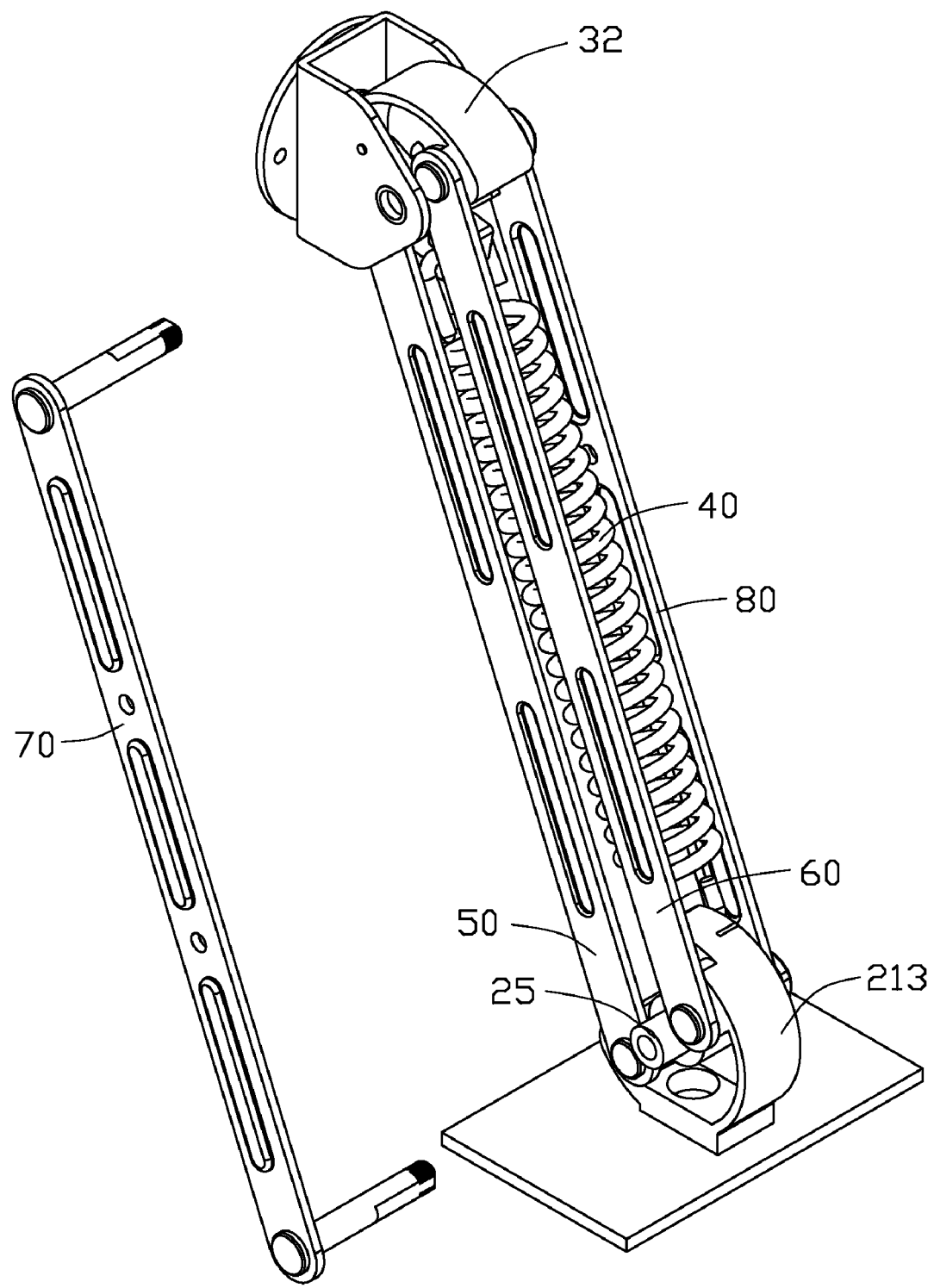
FIG. 3 is a partial, exploded, isometric view of the support stand in FIG. 1.

Referring also to FIGS. 2 and 3, the first connecting module 20 includes a base member 21, two frictional members 23, and two restricting poles 25.

The base member 21 includes a base plate 211, and a mounting base 213 positioned on the base plate 211. The mounting base 213 is substantially semi-cylindrical. The mounting base 213 defines a circular pivot hole 2131 in a center portion, and two receiving through holes 2132 in opposite sides of the pivot hole 2131 to receive the frictional members 23. An inner surface of each receiving through hole 2132 defines a slot 2133. The mounting base 213 further includes a hook 2135 extending from an end of the mounting base 213 away from the base plate 211.

Each frictional member 23 includes a frictional portion 231, and a fixing portion 233. The frictional portion 231 is substantially cylindrical and has a slit 2311 extending substantially parallel to a central axis of the frictional portion 231. The fixing portion 233 is formed on the frictional portion 231 adjacent to the slit 2311, and can be inserted in the slot 2133 of the mounting base 213.

Each restricting pole 25 may be cylindrical. The restricting poles 25 are fixed on opposite sides of the mounting base 213. In an alternative embodiment, the restricting poles 25 may be integrally formed with the mounting base 213.

The second connecting module 30 includes a mounting bracket 31, a connecting base 32, an elastic member 33, a torsion assembly 34, a limiting member 35, and a washer 36.

The mounting bracket 31 includes a base portion 311, a first side portion 313 and a second side portion 315, both extending substantially perpendicularly from opposite sides of the base portion 311. The first side portion 313 defines a circular pivot hole 3131 and a fixing hole 3133. The second side portion 315 defines a circular pivot hole 3151 corresponding to the pivot hole 3131, and a limiting groove 3153 in an edge adjacent to the pivot hole 3151. The mounting bracket 31 further includes a mounting plate 317 fixed to the base portion 311 to hold a flat-panel display monitor.

Figure 4:
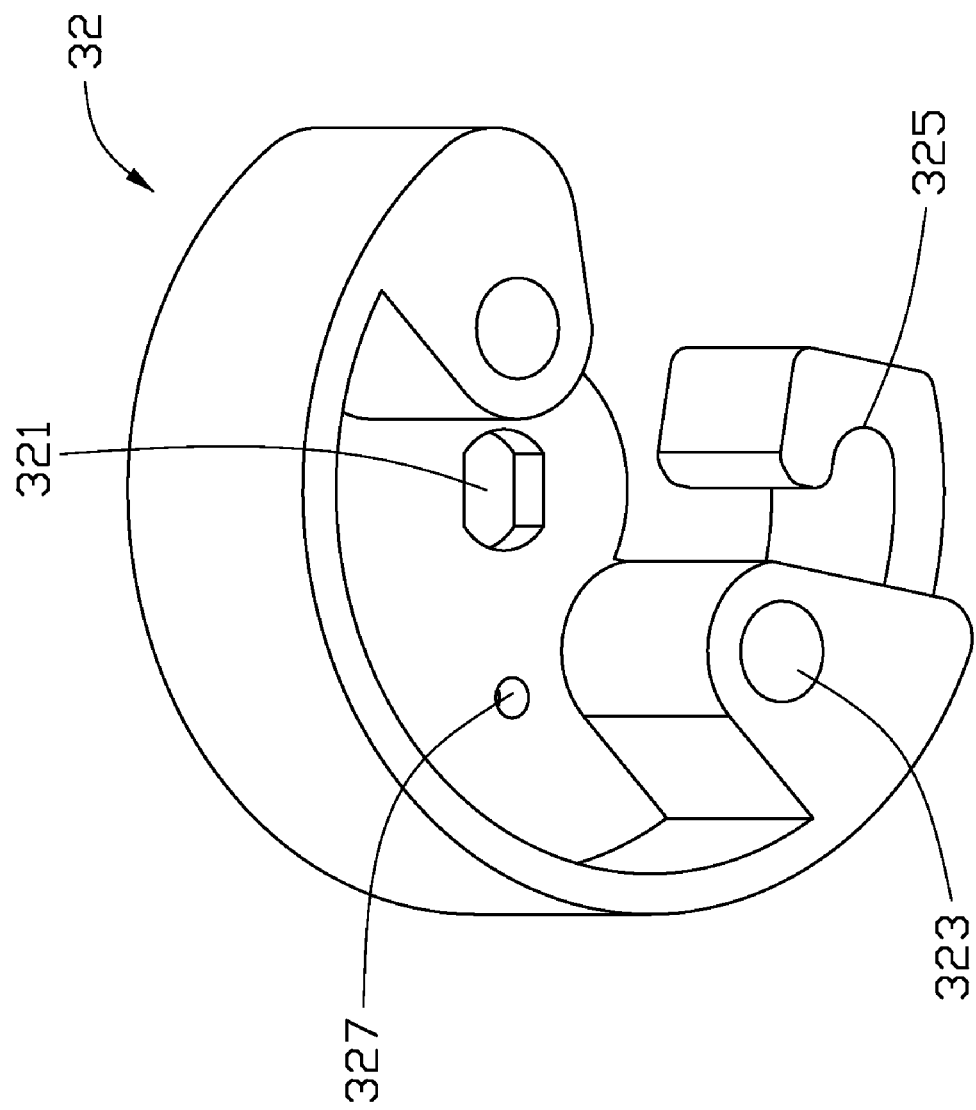
FIG. 4 is an isometric view of the connecting base in FIG. 1.

Referring also to FIG. 4, the connecting base 32 is similar in principle to the mounting base 213. The connecting base 32 defines a non-circular pivot hole 321 in a center portion, two receiving through holes 323 in opposite sides of the pivot hole 321, and forms a hook 325 on an end. The connecting base 32 further defines a fixing hole 327 adjacent to the pivot hole 321. The connecting base 32 is positioned between the first and second side portions 313, 315 of the mounting bracket 31.

The elastic member 33 may be a pair of spring washers. Alternatively, the elastic member 33 may be helical springs, elastic rubber rings, or cylinders.

The torsion assembly 34 includes a sleeve 341 and a torsion spring 343 clasped on the sleeve 341. The torsion spring 343 has two ends 3431 extending out from the torsion spring 343 to be inserted, respectively, in the fixing holes 3133, 327.

The limiting member 35 defines a non-circular hole 353 in a center portion, and forms a limiting piece 351 on an edge to engage in the limiting groove 3153 of the mounting bracket 31.

The washer 36 is substantially ring-shaped, and positioned adjacent to the limiting member 35 to reduce wear and tear of the limiting member 35.

The resilient member 40 may be a helical spring with a first end fixed to the hook 2135 of the mounting base 213 and a second end fixed to the hook 325 of the connecting base 32.

The first link shaft 50 may be a substantially elongated plate with two rounded ends. The two ends of the first link shaft 50 each define a circular mounting hole 51, and are connected respectively on the mounting base 213 and the connecting base 32. The second link shaft 60 may be identical to the first link shaft 50.

The first support bracket 70 is similar in principle to the first link shaft 50, and defines two circular pivot holes 71 in two ends. The second support bracket 80 is identical to the first support bracket 70, and defines two circular pivot holes 81 in two ends.

The pivot module 90 includes two pivot assemblies 91 and four rotatable assemblies 93.

The pivot assembly 91 includes a pivotal shaft 911 and a fastening member 913. The pivotal shaft 911 forms two symmetrical opposite flat surfaces (not labeled), thus forming a non-circular shaft portion. The pivotal shaft 911 further forms a threaded portion (not labeled) on a distal end. The fastening member 913 may be a nut to engage with the threaded portion of the pivotal shaft 911.

Figure 5:
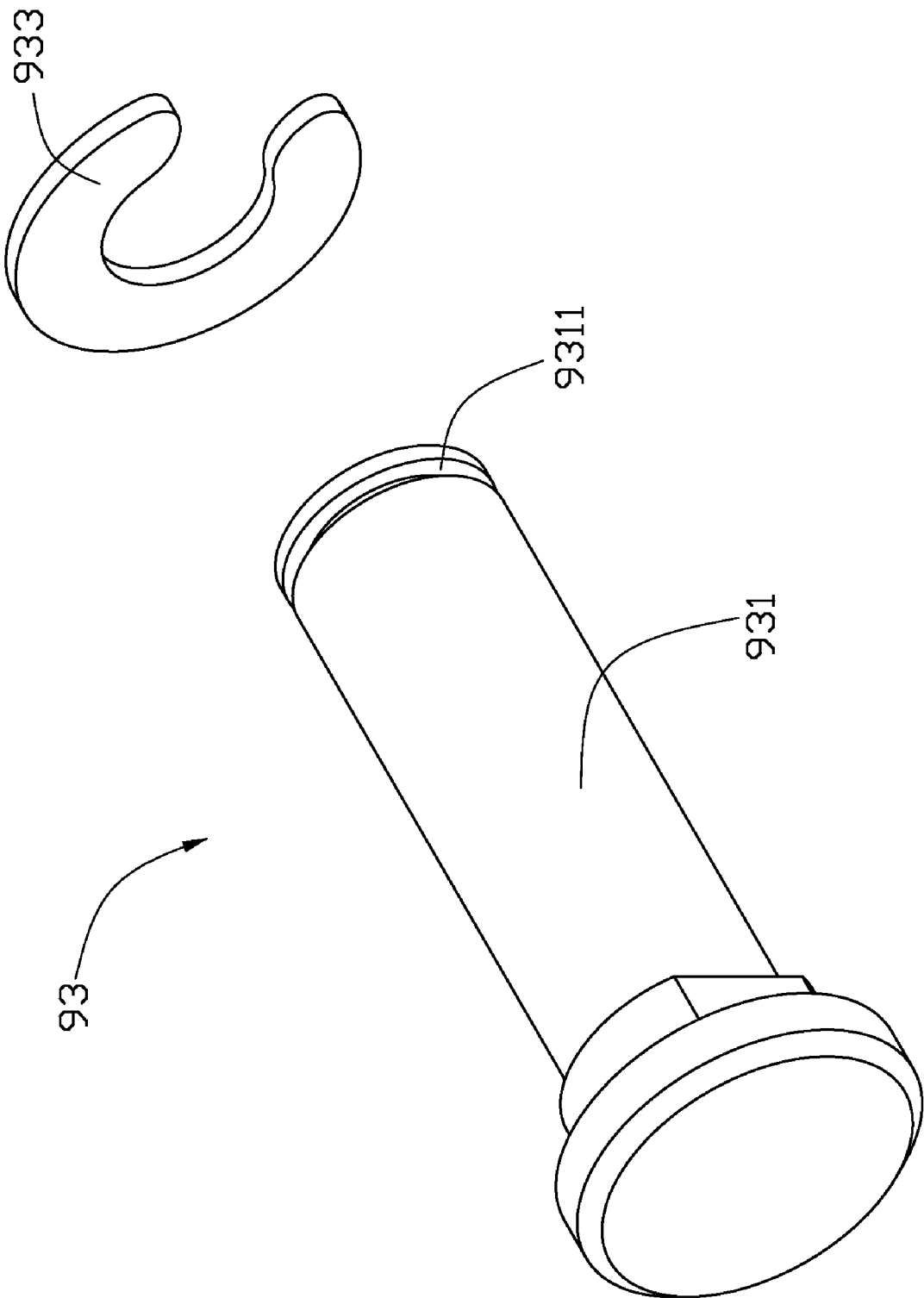
FIG. 5 is an exploded, isometric view of the rotatable assembly in FIG. 1.

Referring also to FIG. 5, the rotatable assembly 93 includes a rotatable shaft 931 and a latching member 933. The rotatable shaft 931 defines a latching groove 9311 in a distal end. The latching member 933 may be a C-shaped latching ring to engage in the latching groove 9311.

The support stand 10 may be assembled by first connecting the mounting base 213 and the connecting base 32 with the resilient member 40. The frictional members 23 are received in the receiving through holes 2132, and the fixing portions 233 are inserted in the slots 2133. One rotatable shaft 931 is passed through one mounting hole 51 of the first link shaft 50, one frictional member 23, and engaged with one latching member 933. The other rotatable shaft 931 is passed through the other mounting hole 51 of the first link shaft 50, the receiving through hole 323, and engaged with the other latching member 933. The first link shaft 50 is now rotatably connected to the mounting base 213 and the connecting base 32. The second link shaft 60 is rotatably connected to the mounting base 213 and the connecting base 32 by the same way.

The first and second support brackets 70, 80 may be assembled as follows. One pivotal shaft 911 is consecutively passed through one pivot hole 71 of the first support bracket 70, one restricting pole 25, the pivot hole 2131 of the mounting base 213, the other restricting pole 25, one pivot hole 81 of the second support bracket 80, and finally engaged with one fastening member 913. The other pivotal shaft 911 is consecutively passed through the other pivot hole 71 of the first support bracket 70, the pivot hole 3131 of the mounting bracket 31, the torsion assembly 34, the pivot hole 321 of the connecting base 32, the limiting member 35, the washer 36, the elastic member 33, the pivot hole 3151 of the mounting bracket 31, the other pivot hole 81 of the second support bracket 80, and finally engaged with the other fastening member 913. The first and second support brackets 70, 80 are now rotatably connected to the mounting base 213 and the connecting base 32.

After assembly, the first and second link shafts 50, 60, the mounting base 213 and the connecting base 32 cooperatively form a four-bar linkage. The mounting bracket 31 is rotatable relative to the base member 21 due to the four-bar linkage. The height of the mounting bracket 31 with a flat-panel display monitor (not shown) may be increased or decreased by pushing the flat-panel display monitor upwards or downwards, so that the first and second link shafts 50, 60 rotate relative to the base member 21. When the first and second link shafts 50, 60 abut against the restricting pole 25, the four-bar linkage has reached a limiting position and cannot rotate further. Thus, an adjusting range of the height of the flat-panel display monitor is restricted. Since the restricting pole 25 has a higher structural strength than the retaining piece in the typical support stand, the support stand 10 is not easily abraded or damaged by exterior forces. The support stand 10 has a good impact resistance and a satisfactory limiting effect. In addition, the restricting pole 25 engages with the first and second link shafts 50, 60 to realize the limiting effect, the curved retaining groove of the typical support stand is unnecessary, so that the production of the support stand 10 is simple and convenient.

The height of the flat-panel display monitor is changed by the four-bar linkage, but the viewing angle of the flat-panel display monitor has not changed. The display monitor can be stably maintained at any desired height by frictional forces generated between the components of the support stand 10. The resilient member 40 provides a resilient force between the mounting base 213 and the connecting base 32 to balance the weight of the flat-panel display monitor. Thus, the flat-panel display monitor may be stably maintained at the any desired height even when the frictional forces created by components of the support stand 10 become low. The first and second support brackets 70, 80 are rotatably fixed to the mounting base 213 and the connecting base 32 to provide auxiliary support for the flat-panel display monitor. Therefore, the support stand 10 may be used for a heavy flat-panel display monitor. It should be understood that if the weight of the flat-panel display monitor is not too heavy, the first and second support brackets 70, 80 may be omitted.

The viewing angle of the flat-panel display monitor is adjusted by rotating the flat-panel display monitor with the mounting bracket 31 around an axis of the pivot shaft 911. The limiting piece 351 of the limiting member 35 engages with the limiting groove 3153 of the mounting bracket 31, thus restricting an adjusting range of the viewing angle of the flat-panel display monitor. The flat-panel display monitor may be stably maintained at any desired viewing angle by frictional forces generated between the components of the second connecting module 30. A torsion force of the torsion spring 343 either increases or decreases depending on the rotation of the mounting bracket 31, thereby preventing an excessive force from damaging the support stand 10.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A support stand for a flat-panel display monitor, comprising:
   a mounting base;
   a connecting base;
   two link shafts, each link shaft having a first end rotatably connected to the mounting base and a second end rotatably connected to the connecting base;
   a restricting pole fixed to the mounting base and positioned between the two link shafts, the restricting pole abuts against the two link shafts, thus restricting a rotary range of the two link shafts;
   a first support bracket and a second support bracket rotatably connected to the mounting base and the connecting base; and
   a pivot assembly comprising a pivotal shaft and a fastening member; wherein the mounting base defines a pivot hole; the pivotal shaft inserts through one end of the first support bracket, the restricting pole, the pivot hole of the mounting base, one end of the second support bracket, and engages with the fastening member.

2. The support stand of claim 1, further comprising a resilient member positioned between the mounting base and the connecting base to provide resilient force.

3. The support stand of claim 2, wherein the resilient member is a helical spring; the mounting base forms a first hook; the connecting base forms a second hook; the two ends of the resilient member are fixed respectively to the first and second hooks.

4. The support stand of claim 1, wherein the restricting pole is integrally formed with the mounting base.

5. The support stand of claim 1, wherein the mounting base defines two receiving through holes in opposite sides of the pivot hole; the support stand further comprises four rotatable assemblies, each rotatable assembly comprises a rotatable shaft and a latching member, the rotatable shaft inserts through one end of the link shaft, one receiving through hole of the mounting base, and engages with the latching member.

6. The support stand of claim 5, wherein an end of the rotatable shaft defines a latching groove; the latching member is a C-shaped latching ring engaged in the latching groove.

7. The support stand of claim 5, further comprising two frictional members received respectively in the two receiving through holes of the mounting base; an inner surface of each receiving through hole defines a slot; each frictional member forms a fixing portion, the fixing portion is inserted in the slot.

8. The support stand of claim 7, wherein the frictional member comprises a frictional portion, the frictional portion is substantially cylindrical and has a slit extending substantially parallel to a central axis of the frictional portion; the fixing portion is formed on the frictional portion adjacent to the slit.

9. The support stand of claim 1, wherein a threaded portion is formed at an end of the pivotal shaft; the fastening member is a nut engaged with the threaded portion.

10. A support stand for a flat-panel display monitor, comprising:
 a first connecting module;
 a second connecting module; and
 two link shafts, each link shaft having a first end rotatably connected to the first connecting module and a second end rotatably connected to the second connecting module;
 wherein the first connecting module comprises a restricting pole positioned between the two link shafts, the restricting pole abuts against the two link shafts, thus restricting a rotary range of the two link shafts; the second connecting module comprises a mounting bracket rotatably connected to the two link shafts; the support stand further comprises a first support bracket and a second support bracket rotatably connected to the first and second connecting modules, and a first pivot assembly comprising a first pivotal shaft and a fastening member; the first connecting module further comprises a mounting base defining a pivot hole; the first pivotal shaft inserts through one end of the first support bracket, the restricting pole, the pivot hole of the mounting base, one end of the second support bracket, and engages with the fastening member.

11. The support stand of claim 10, wherein the mounting bracket comprises a base portion, a first side portion and a second side portion, both portions extending substantially perpendicularly from opposite sides of the base portion; each of the first and second side portions defines a circular pivot hole; the second connecting module comprises a connecting base positioned between the first and second side portions, the connecting base defines a non-circular pivot hole; the support stand further comprises a second pivot assembly comprising a second pivotal shaft inserted through the circular pivot holes of the mounting bracket and the non-circular pivot hole of the connecting base.

12. The support stand of claim 11, wherein the second connecting module further comprises a torsion assembly sleeved on the second pivotal shaft; the first side portion of the mounting bracket defines a first fixing hole; the connecting base defines a second fixing hole; the torsion assembly comprises a torsion spring, two ends of the torsion spring are inserted respectively in the first and second fixing holes.

13. The support stand of claim 11, wherein the second connecting module further comprises a limiting member sleeved on the second pivotal shaft; the limiting member forms a limiting piece on an edge; the second side portion of the mounting bracket defines a limiting groove; the limiting piece engages in the limiting groove.

14. The support stand of claim 13, wherein the second connecting module further comprises a washer sleeved on the second pivotal shaft and positioned adjacent to the limiting member to reduce wear and tear of the limiting member.

15. The support stand of claim 11, wherein the second connecting module further comprises an elastic member sleeved on the second pivotal shaft to provide an elastic force along the second pivotal shaft.

16. The support stand of claim 10, further comprising a resilient member positioned between the first and second connecting modules to provide resilient force.

17. The support stand of claim 16, wherein the resilient member is a helical spring, the first connecting module includes a first hook, the second connecting module includes a second hook; the two ends of the resilient member are fixed respectively to the first and second hooks.

* * * * *